United States Patent Office 2,961,734
Patented Nov. 29, 1960

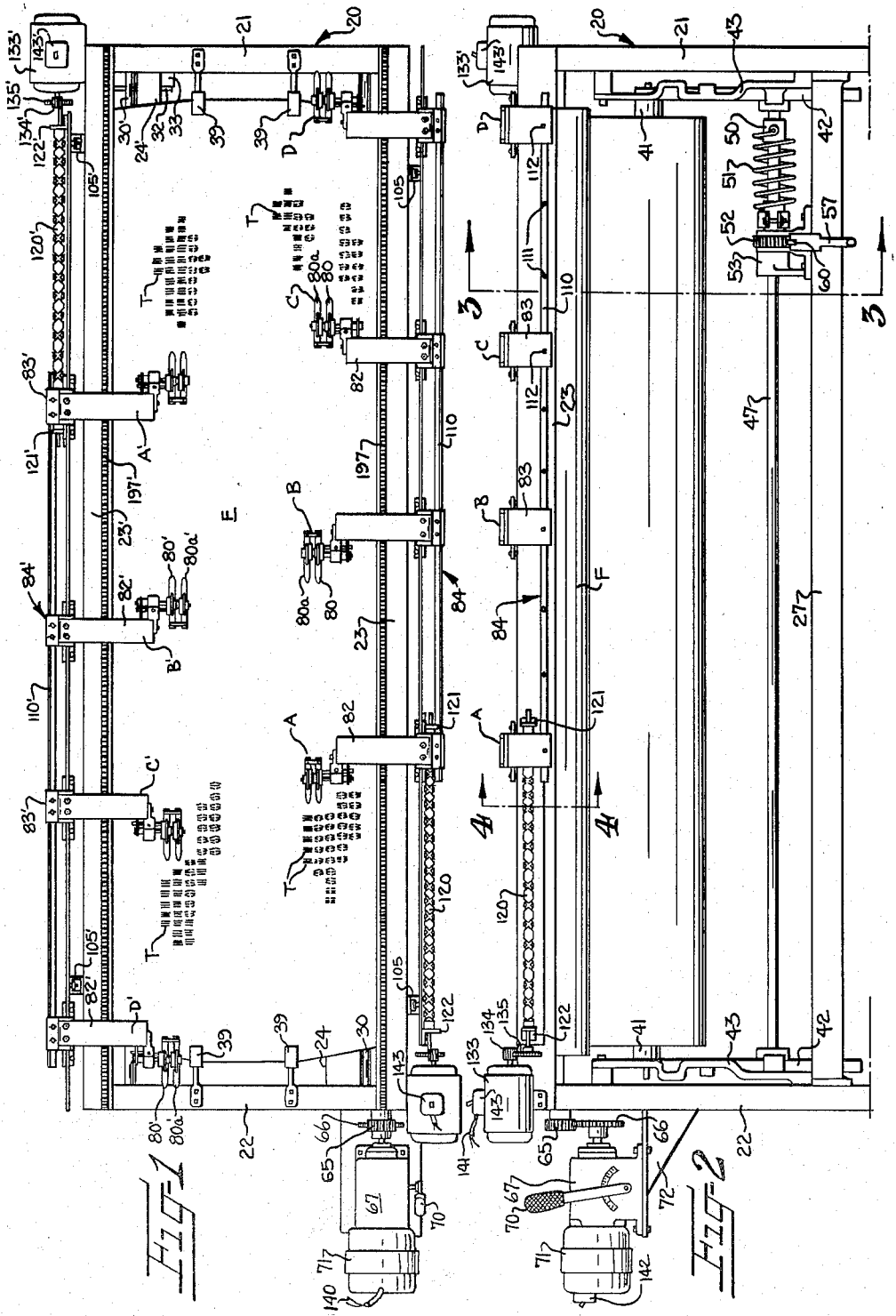

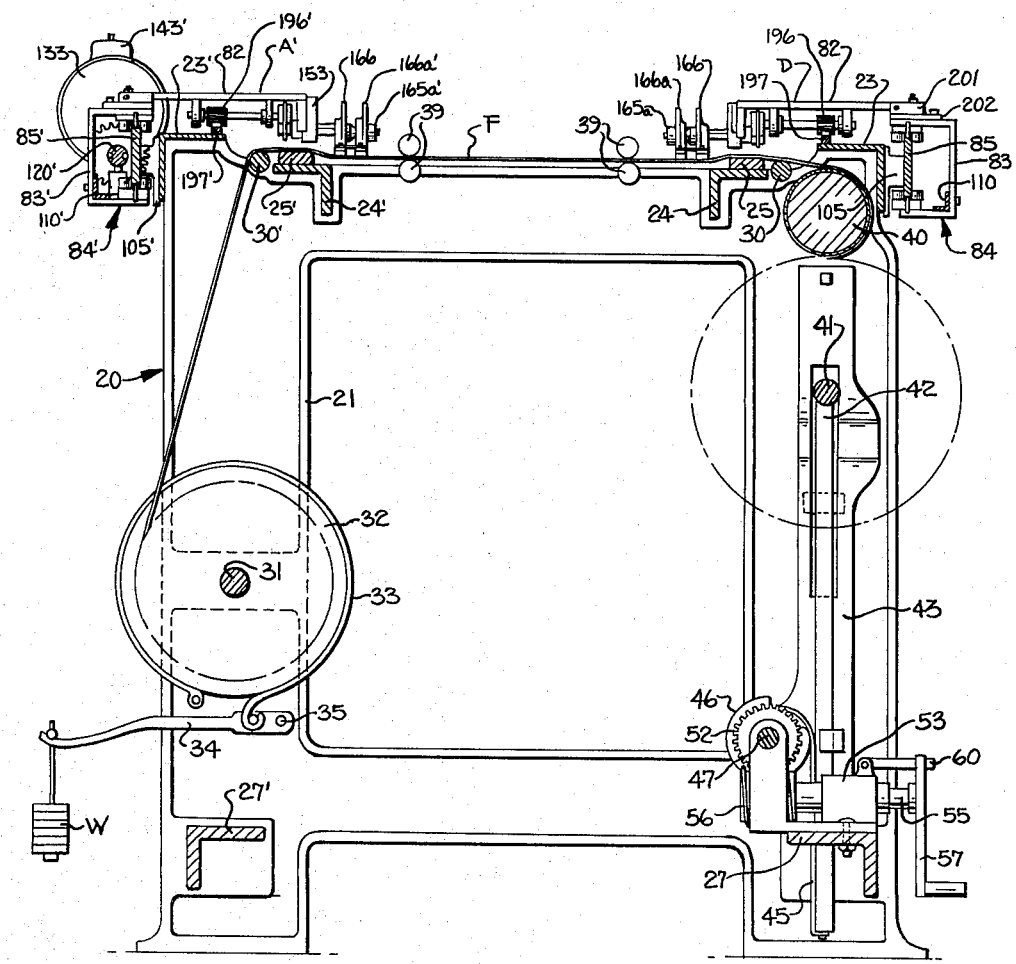

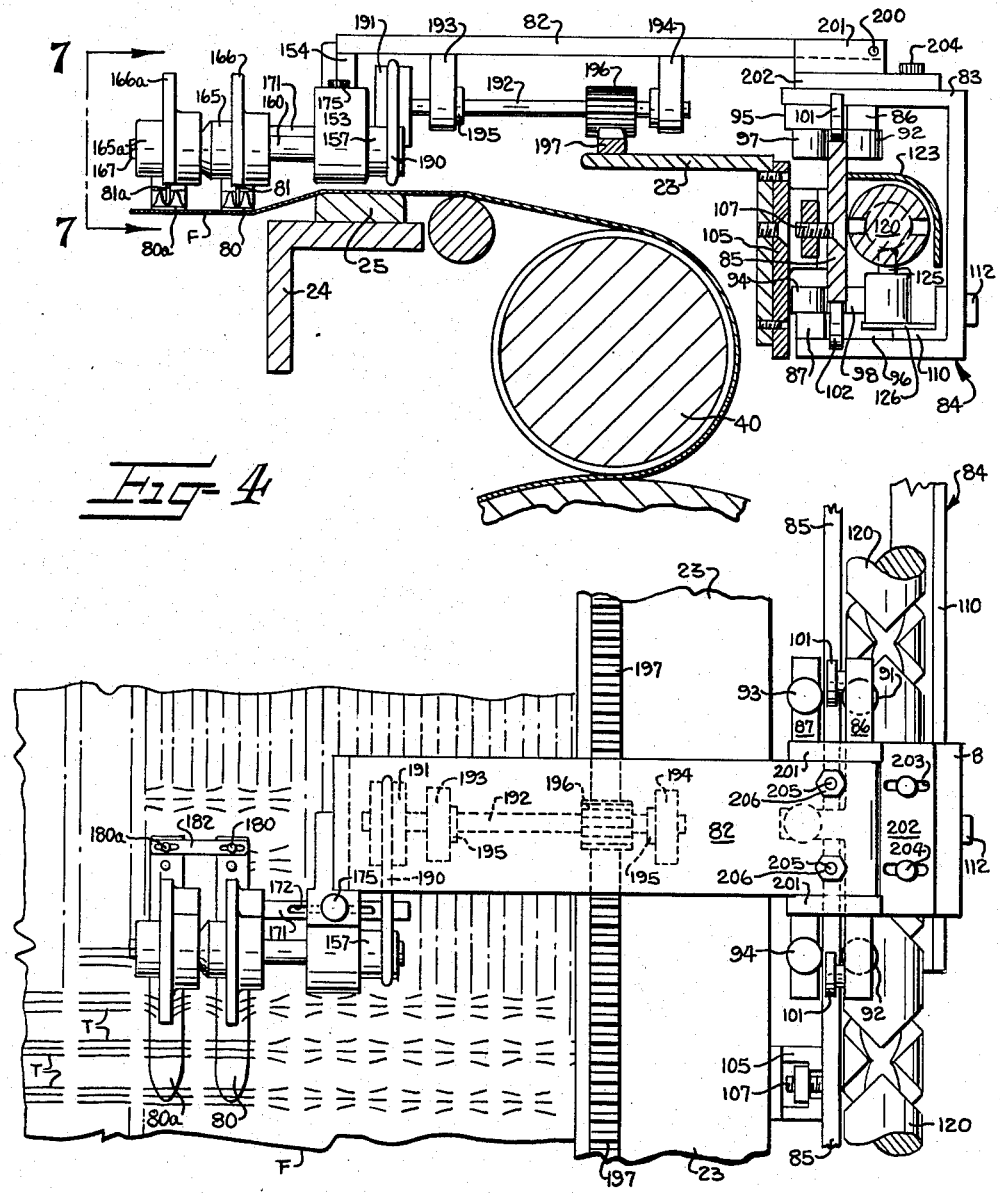

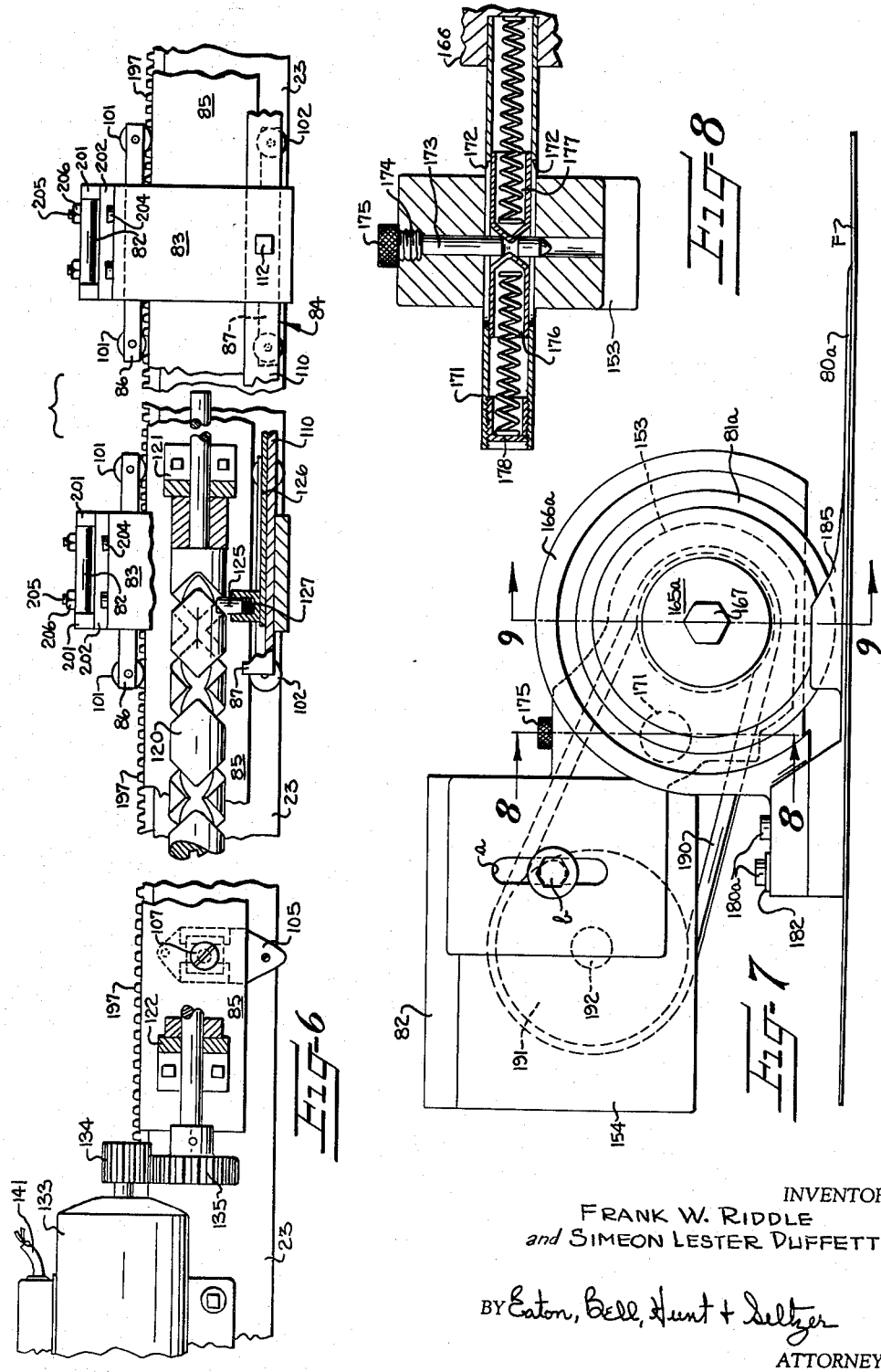

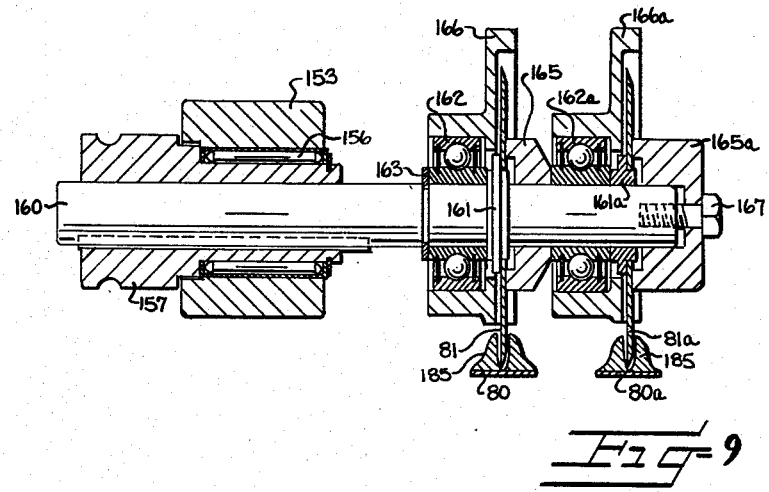
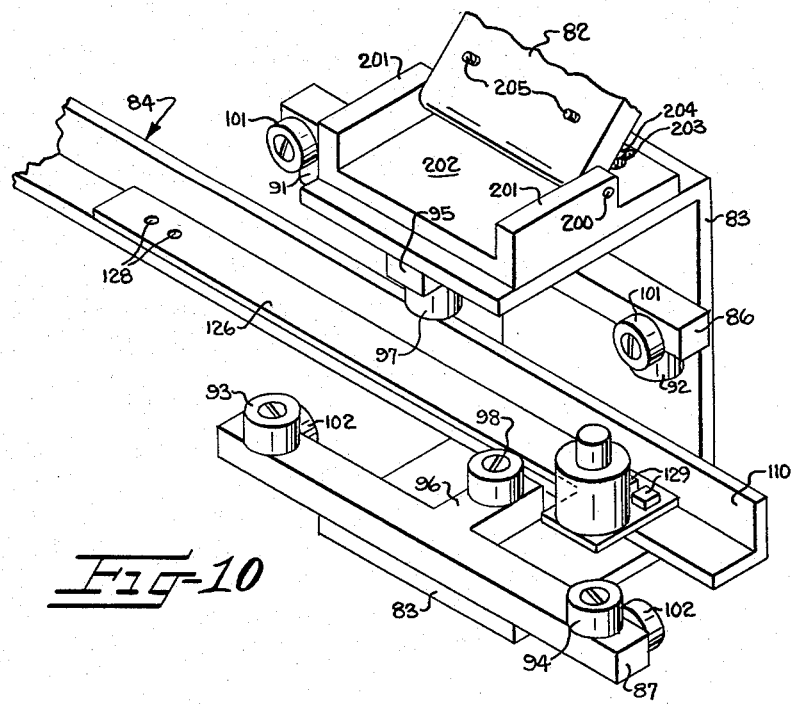

2,961,734

FLOAT CUTTING APPARATUS

Frank W. Riddle, Biscoe, and Simeon Lester Duffett, Laurinburg, N.C., assignors to Scotland Mills, Inc., Laurinburg, N.C., a corporation of North Carolina Filed Mar. 11, 1958, Ser. No. 720,576

6 Claims. (Cl. 26—12)

This invention relates to apparatus for cutting floats and loops formed on woven or knitted fabric in the production of tufted fabrics, such as bedspreads, draperies and the like.

In the manufacture of tufted woven fabrics, for example, successive alternate or spaced portions of either warp or filler yarns are floated for considerable distances or relatively short distances on the surfaces of the fabric. Yarns floated in this manner are frequently termed as tuft cords. Either during or after the weaving of the fabric, the floats or tuft cords are severed and then the fabric is finished in the desired manner to produce the desired tufted effect.

This application is a continuation-in-part of our copending application, Serial Number 695,754, filed November 12, 1957, and entitled Float Cutting Apparatus for Looms.

The apparatus disclosed in said copending application performs satisfactorily in severing tuft cords on a loom while the fabric is being woven. However, there are instances in which it is desirable that the severing of the tuft cords be accomplished after the fabric has been removed from the loom or at a place remote from the loom. For example, a manufacturer may elect to fill a relatively small order for tufted fabrics by weaving the same upon a relatively large number of looms and, upon weaving the desired number of yards of fabric having tuft cords thereon, he may elect to weave other types of fabrics on these same looms. Thus, it would be unduly expensive and time consuming to equip all such looms with a tuft cutting apparatus which might be used for only a relatively short period. Also, some manufacturers manufacture knitted fabrics on which tuft cords are formed either during or after knitting the fabric.

It is therefore an object of this invention to provide a novel independent tufted cord cutting apparatus capable of cutting randomly arranged or transverse rows of longitudinally extending tuft cords on a moving base fabric, which base fabric may move continuously or intermittently and which apparatus insures that all tuft cords or floats throughout the width and length of the fabric are severed at substantially the central portions thereof.

It is another object of this invention to provide an improved float or tuft cord cutting apparatus having means for moving and taking up a fabric while moving the same in a substantially horizontal path and completely severing transverse rows of tuft cords through utilization of multiple weftwise cutter heads and respective plows. A series of spaced cutter heads preferably is arranged at both the front and rear of the machine and the cutter heads are individually movably supported so as to move with the tuft cords or floats relative to the carriages therefor, each of the cutter heads being so mounted as to be adjustable forwardly and rearwardly as well as upwardly and downwardly relative to the direction of movement of the fabric. Further, each of said cutter heads is pivotally supported by means which facilitate pivoting the same upwardly and forwardly away from the fabric or outwardly away from the fabric so as to fully expose the corresponding areas of the fabric as well as to facilitate lubrication thereof and/or making repairs to the individual cutter heads.

It is still another object of this invention to provide novel means for reciprocating the carriage at each side of the machine on which the cutter heads are supported, wherein a driven reversely threaded shaft carried by the machine is engaged by a follower on each of the corresponding carriages.

It is a further object of this invention to provide means for varying the rate at which the fabric is moved to thereby facilitate adjustment of the rate of movement of the fabric to correspond with the rate of movement of the cutter heads transversely of the fabric.

Some of the objects of the invention having been stated, other objects will appear as the description proceeds when taken in connection with the accompanying drawings, in which—

Figure 1 is a top plan view of the novel float cutting machine;

Figure 2 is a front elevation of the machine shown in Figure 1;

Figure 3 is an enlarged vertical sectional view taken substantially along line 3—3 in Figure 2;

Figure 4 is an enlarged vertical sectional view taken substantially along line 4—4 in Figure 2 showing one of the cutting devices and the carriage at the front of the machine;

Figure 5 is a fragmentary plan view of the structure shown in Figure 4;

Figure 6 is an enlarged elevation of the carriage reciprocating mechanism showing the upper left-hand portion of Figure 2, but being partially in section with parts broken away for purposes of clarity;

Figure 7 is an enlarged elevation of one of the cutter heads looking along line 7—7 at the left-hand side of Figure 4;

Figure 8 is a fragmentary vertical sectional view taken substantially along line 8—8 in Figure 7;

Figure 9 is a vertical sectional view taken substantially along line 9—9 in Figure 7;

Figure 10 is an isometric view looking at the inside of one of the carriage brackets showing how the same is supported for movement along the trackway, but omitting the trackway.

Referring more specifically to the drawings, the cutter head, the means for rotating the cutting blade, the cutter head supports, the carriages at the front and rear of the machine, and the means for imparting reciprocatory movement to the carriages are quite similar to those elements disclosed in our copending application, Serial Number 695,754 previously referred to. However, in the present instance, each cutter head assembly includes a plurality of cutters with respective plows and the carriages for the respective front and rear cutter head assemblies may be reciprocated continuously during operation of the machine.

In Figures 1, 2 and 3, the machine comprises a main frame broadly designated at 20 and including right-hand and left-hand side frame members 21, 22 whose upper portions are spanned by respective pairs of front and rear transverse frame members 23, 24 and 23′, 24′. The transverse frame members 23, 23′ may be termed as respective front and rear breast beams and the frame members 24, 24′ may be termed as fabric supporting and guiding beams. The latter beams 24, 24′ have respective ridge bars 25, 25′ thereon over which the fabric F passes during operation of the machine.

The lower portions of the side frame members 21, 22 are spanned by suitable frame members 27, 27', while guide rods 30, 30' are also provided adjacent the distal surfaces of the fabric supporting beams 24, 24' to further assist in guiding the fabric. The fabric F is drawn from a suitable source under tension, such source being shown in the form of a cloth roll 31 suitably journaled in the side frame members 21, 22.

Any suitable means may be provided for applying tension to the fabric F as it is drawn from the source 31 upwardly over the members 30', 25' by means to be presently described. To this end, a tension apparatus similar to that used on looms is employed, the cloth roll being in the form of a beam having a brake drum 32 thereon which is partially encircled by a brake band 33, one end of the brake band being connected to the side frame member 21 and the other end thereof being connected to a medial portion of a lever 34. The lever 34 is pivoted at 35 on the side frame member 21 and its other end has suitable weight means W mounted thereon to thus apply pressure to the brake band 33, thereby providing means whereby the fabric F can be placed under a suitable amount of tension.

It will be noted that, as the fabric F is withdrawn from the source 31, it moves in a substantially horizontal path between the fabric supporting frame beams 24, 24' and then passes about a fabric advancing roll 40, which roll is preferably provided with a friction surface similar to that of the sand roll of a loom. The roll 40 is driven by a variable speed drive mechanism to be later described to thereby provide means whereby the speed of the fabric F may be predetermined to correspond with the spacing of the floats of tuft cords T, as well as the length of the tuft cords in proportion to the rate of movement of the cutting devices. Suitable stretching or tensioning devices 39, which may be similar to conventional loom temples, are provided on the frame members 21, 22 for engaging opposite side edge portions of the fabric F and to thereby maintain the fabric F under lateral tension.

The fabric F passes from the fabric advancing roll 40 to a take-up roll 41 which may be supported in the same manner as that usually found in looms. In this instance, the cloth or fabric F wound on the take-up roll 41 is maintained in frictional or pressure engagement with the fabric advancing roll 40 by means of upwardly biased take-up roll supports 42 which are mounted for vertical movement in guide columns 43 at opposite sides of the machine. The guide columns 43 are suitably secured to the respective side frame members 21, 22. The lower end of each of the vertically movable supports 42 has a cable or cord 45 connected thereto which extends upwardly and is fixed to a corresponding collar 46 rigidly mounted on a shaft 47. The shaft 47 is journaled in the guide columns 43 and is spaced above the front lower transverse frame member 27 as best shown in Figures 2 and 3.

The roll supports 42 are normally urged upwardly by the cords 45 connected to their lower ends through torsional resilient pressure being applied to the respective collars 46. To this end, it will be observed in Figure 2 that the shaft 47 has a collar 50 fixed thereon to which one end of a torsion spring 51 is secured. The torsion spring 51 encircles a portion of the shaft 47 and is connected at its other end to the hub of a pinion or worm gear 52 which is loosely mounted on the shaft 47 and bears against a composite bearing bracket 53. The bearing bracket 53 is fixed upon the lower front transverse frame member 27. It will be observed in Figure 3 that the bearing bracket 53 also has a relatively short shaft 55 journaled therein on which a worm 56 is fixedly mounted and which meshes with the pinion or worm gear 52. The front end of the shaft 55 is provided with a crank handle 57 having a notch in its upper end which notch is adapted to receive a latch 60 pivotally mounted on the bearing bracket 53 to maintain the crank handle in the desired adjusted position. It is apparent that rotation of the crank handle 57 varies the amount of torsional pressure imparted to the collars 46 fixed on the shaft 47 and thus varies the amount of upward pressure imparted to the take-up roll 41 and the fabric F wound thereon. As heretofore stated, various other means may be used for maintaining tension in the fabric F as it is taken up.

The fabric advancing roll 40 is journaled at opposite ends thereof in the side frame members 21 and 22. It will be observed in Figures 1 and 2 that one reduced end of the fabric advancing roll 40 has a gear or pinion 65 fixed thereon which meshes with a gear or pinion 66 driven by a suitable variable speed mechanism which is shown in the form of a box 67 in Figures 1 and 2. The output speed imparted to the gear 66 may be varied by manual movement of a lever 70 mounted on the exterior of the box 67. Since there are many different types of variable speed mechanisms which may be employed for the intended purpose, a detailed illustration and the description thereof is deemed unnecessary. By way of example, a variable speed mechanism such as a conventional Reeves variable speed driving mechanism or the variable speed drive disclosed in United States Patent 2,810,296 to Long issued October 22, 1957, may be used.

The variable speed mechanism 67 may be driven by an electric motor 71, the electric motor 71 and the variable speed drive mechanism 67 being shown as interconnected and mounted on a bracket 72 carried by the side frame member 22.

The float cutting apparatus comprises a plurality of cutter heads which are spaced in substantially alined relationship along the width of the machine at each of the front and rear ends thereof. Since the cutting apparatus at the rear of the machine is identical to the cutting apparatus at the front of the machine, only the apparatus at the front of the machine will be described and like parts associated with the apparatus at the back or rear of the machine will bear the same reference characters with the prime notation added. In this instance, four cutter head assemblies are shown at the front of the machine in Figures 1 and 2, which are generally designated at A, B, C and D. Like parts associated with each of the latter cutter heads will bear the same reference characters in order to avoid repetitive description. The cutter heads A, B, C and D are generally of the type disclosed in our copending application, Serial Number 695,754, and in United States Patent No. 2,685,309 to Schaller issued August 3, 1954. The cutter head assemblies A, B, C and D each include a plurality of parallel closely spaced plows; two in this instance, which are designated at 80, 80a. The plows 80 and 80a, associated with the left-hand cutter head assemblies A, B, face toward the left in Figure 1, and the plows 80, 80a of the cutter head assemblies C, D face in the opposite direction or toward the right in Figure 1. The plows 80, 80a preferably engage the fabric F inwardly of the ridge bar or rigid support 25 and adjacent thereto, and it will be observed in Figure 9 that the plows 80, 80a have respective circular rotary cutting blades 81, 81a associated therewith, as will be more fully described hereinafter.

The cutter head assemblies A, B, C and D are each carried by a swing arm 82 which normally occupies a substantially horizontal position as shown in Figures 4 and 5. Each arm 82 extends forwardly or to the right in Figures 4 and 5 and is mounted for vertical and horizontal adjustment on a substantially C-shaped carriage bracket 83, all of the brackets 83 being parts of a carriage broadly designated at 84. The carirage brackets 83 are mounted for substantially horizontal movement transversely of the main frame 20 and parallel to the breast beam 23 on a common plate-like trackway 85 suitably supported on the breast beam 23.

Each of the carriage brackets 83 is guided and supported for horizontal movement on the trackway 85 by means of a plurality of rollers (Figure 10). To this end, the upper flange of the substantially C-shaped carriage bracket 83 has an elongated bar 86 fixed thereto, a corresponding bar 87 being fixed to the upper surface of the lower flange of the carriage bracket 83. Opposite end portions of the bars 86, 87 have respective pairs of spaced guide rollers 91, 92 and 93, 94 journaled thereon for rotation about respective substantially vertical axes. The upper pair of rollers 91, 92 engages the outer surface of the trackway 85 adjacent its upper edge and the bottom pair of rollers 93, 94 engages the inner surface of the trackway 85 adjacent its lower edge.

The bars 86, 87 have respective outwardly and oppositely projecting medial portions 95, 96 thereon which extend past the respective upper and lower edges of the trackway 85 and have respective guide rollers 97, 98 journaled thereon for engaging the respective upper and lower portions of the trackway 85 at its respective rear and front or inner and outer surfaces. The opposite end portions of the upper and lower bars 86, 87 also have respective pairs of rollers 101, 102 journaled thereon for engaging the respective upper and lower edges of the trackway 85. It is thus seen that the rollers 91–94, 97 and 98 maintain the stability of the carriage bracket 83 during movement thereof along trackway 85 while the rollers 101, 102 support the carriage bracket 83 and also assist in maintaining the carriage bracket 83 stable during its movement along the trackway 85.

The trackway 85 is adjustably secured to the outer surface of the breast beam 23 by means of horizontally spaced support brackets 105. The brackets 105 are suitably secured to the front surface of the breast beam 23 and are provided with slotted outer portions, each of which is penetrated by a bolt 107 for adjustably securing the trackway 85 to the corresponding brackets 105. The brackets 83 of the carriage 84 are interconnected by means of a rigid frame member 110 which is shown in the form of a relatively small angle bar in Figures 4, 5 and 10. The vertical flange of the angle bar 110 is preferably provided with a plurality of threaded holes 111 therein (Figure 2). Screws 112 (Figures 2, 4 and 5) penetrating the web portions of the brackets 83, may be threaded into certain ones of these threaded holes 111, thereby facilitating relative adjustment of the carriage brackets 83 to accommodate fabrics of varying widths.

As heretofore stated, means are provided for imparting reciprocatory movement to the carriage 84, which means is similar to that disclosed in our copending application, Serial Number 695,754. Referring to Figures 1 through 6, there will be observed a reversely threaded worm shaft 120 which may extend throughout the width of the machine, but which is preferably relatively short, extending from adjacent one side of the main frame 20 to a point somewhat greater than one-fourth of the width of the main frame 20. The worm shaft 120 has reduced opposite ends journaled in bearing blocks 121, 122 suitably secured to the front surface of the trackway 85. The worm shaft 120 is so located and of such diameter that the web portions of the carriage brackets 83 pass outwardly of the same during reciprocation thereof. It will be noted in Figures 4, 5 and 10 that the flanges of the carriage brackets 83 straddle the worm or the horizontal plane of the worm shaft 120. The worm shaft 120 is preferably provided with a suitable shield or cover 123 (Figure 4) which may be suitably secured to the trackway 85. The shield 123 is omitted in other views for purposes of clarity.

The reversely spiralled groove in the worm shaft 120 is engaged by a spring-loaded follower 125 (Figures 6 and 10) which is guided for vertical movement in the enlarged end of an elongated bracket 126, being normally urged into engagement with the groove in the worm shaft 120 by a compression spring 127. The bracket 126 is mounted for longitudinal adjustment, substantially parallel to the axis of the worm shaft 120, on the carriage 84. To this end, it will be observed in Figure 10 that the elongated bracket 126 is provided with a plurality of holes 128 therein through certain ones of which screws 129 may extend for securing bracket 126 in the desired adjusted position.

It will be observed in Figures 1, 2 and 6 that the worm shaft 120 is driven by an electric motor 133 suitably supported on the breast beam 23. Suitable driving connections are provided between the worm shaft 120 and the electric motor 133, which are shown in the form of inter-meshing gears 135, 134 mounted on respective corresponding ends of the worm shaft 120 and the shaft of the motor 133. The motors 71 and 133 have respective electrical conductors 140, 141 extending therefrom to a suitable source of electrical energy, not shown. The electric motors 71 and 133 are preferably provided with individual manually operable switches 142, 143 to enable the carriage 84 to be reciprocated while the fabric F is at a standstill, and vice versa for setting up the machine and testing the operation of the same as may be necessary in making repairs or adjustments in the machine. It is apparent that, when the motor 133 is energized, continuous rotation is imparted to the worm shaft 120 and, since the worm shaft 120 is reversely threaded, the follower 125 is caused to traverse the groove in the worm shaft 120 to thereby impart continuous reciprocatory movement to the carriage 84 and to the cutter head assemblies A, B, C and D. The electric motor 133' is also started at this time and, thereafter, the electric motor 71 is started to impart movement to the fabric F. It is apparent that, as the cutter head assemblies A, B move from right to left in Figure 2 and the opposite cutter head assemblies C' and D' move from right to left in Figure 1, the corresponding plows 80 and 80a engage and pass beneath any floats or tuft cords in the path thereof. On the other hand, the plows 80, 80a of the cutter head assemblies C, D, A' and B' merely ride over previously severed floats or tuft cords T. The plows 80, 80a and 80', 80a' of the cutter head assemblies A, B, C, D and A', B', C', D' may be disposed in slightly offset relationship, as will be later described, to accommodate the differences in the position of the rows of floats and the fabric with movement of each carriage in first one direction and then the other. Also, the plows and corresponding blades of the cutter head assemblies are movable relative to the respective arms 82, 82' so as to move with the fabric as the fabric is taken up by the fabric take-up roll 41, as will be later described. Since the fabric F moves continuously, some of the tuft cords or floats may not be engaged by plows associated with the cutter head assemblies A', B', C', D' during reciprocation of the rear carriage 84'. However, since the cutter head assemblies A, B, C, D move with the carriage 84 independently of the carriage 84', they will engage and sever any floats or tuft cords which were missed by the cutter head assemblies A', B', C', D'. Although each of the cutter head assemblies is provided with only two plows and corresponding blades, it is apparent that a greater number of such plows and blades may be provided as desired and this will permit movement of the fabric at a relatively greater speed as compared to the rate of movement of the carriages 84, 84' transversely of the main frame 20.

As heretofore stated, the cutter head assemblies A, B, C, D and A', B', C', D' are substantially identical and may be of the type disclosed in U.S. Patent No. 2,685,309 to Schaller, although in this instance, each cutter head assembly is provided with a plurality of plows and blades.

Referring to Figures 4, 5, 6, 7, 8 and 9, one of the cutter head assemblies is shown, and it will be observed that this assembly comprises a block-like cutter head support 153 which is suitably secured to and depends from the free end of the corresponding swing arm 82. To this end, the cutter head support 153 has a vertically extending slot *a* in one side portion thereof which is penetrated by a screw b (Figure 7) for securing the cutter head support 153 to a downwardly projecting member 154 formed integral with or suitably secured to the free end of the swing arm 82. It might be stated here that the cutter head support 153 of each of the cutter head assemblies A, B is preferably made opposite hand to the cutter head support 153 of each of the cutter head assemblies C, D. A second outer portion of the cutter head support 153 has a bearing member, preferably a needle bearing 156, fixed therein (Figure 9) which is slidably penetrated by a reduced hub portion of a pulley 157, the pulley being suitably restrained from axial movement. Thus, the pulley 157 is journaled in the support 153. A quill shaft 160 is keyed for axial movement in the pulley 157 and its outer portion remote from the corresponding swing arm 82 has the blades 81, 81a mounted thereon. To this end, it will be observed that the rotary cutting blades 81, 81a are mounted on respective collars 161, 161a which are loosely mounted on the quill shaft 160. These collars bear against the inner races of anti-friction bearings 162, 162a and the inner end of the inner race of the bearing 162 bears against a snap ring or stop element 163 carried by the shaft 160. In order to maintain the cutting blades and their respective plows in proper spaced relationship, a spacing sleeve 165 of predetermined thickness is held against the blade 81 by the inner race of the anti-friction bearing 162a. The outer races of the anti-friction bearings 162, 162a have respective cutting blade shields or cutter head blocks 166, 166a mounted thereon which partially enclose the respective blades 81, 81a and which are restrained from rotation and support the respective plows 80, 80a as will be later described.

A suitable clamping member or cap member 165a fits over the free end of the shaft 160 and is held in engagement with the outermost blade 81a by any suitable means, such as a screw 167 which penetrates the cap member 165a and is threaded into the free end of the quill shaft 160. It is apparent that additional cutter head blocks, cutting blades, plows and anti-friction bearings such as those shown in Figure 9 may be mounted on the shaft 160 and held in proper spaced relationship in exactly the same manner in which the blades 81, 81a and associated elements are maintained in proper spaced relationship. Of course, the shaft 160 may be made longer than that shown in Figure 9 to accommodate additional cutting blades and plows.

Disposed to one side of the quill shaft 160 (Figures 5, 7 and 8) is a tubular guide shaft 171, one end of which is fixed in shield 166 (Figures 4, 5 and 8), and whose medial portion slidably penetrates the cutter head support block 153 and has a pair of diametrically opposed longitudinally extending slots 172 therein. The slots 172 are slidably penetrated by a vertically disposed locator pin 173 mounted for vertical sliding movement in the support block 153. The upper end of the locator pin 173 is preferably threaded, as at 174, and preferably has a knurled handle portion 175 thereon which may be grasped for removing and inserting the locator pin 173 with respect to the support block 153. Since quill shaft 160 is keyed in pulley 157 (Figure 9), it may be slid out of pulley 157 simply by removing locator pin 173 (Figure 8) from support block 153. In other words, locator pin 173 permits removal of the shafts 160 and 171 and the cutter head blocks 166, 166a from the support block 153.

It will be noted in Figure 8 that the portion of the locator pin 173 extending through the tubular guide shaft 171 is engaged at opposite sides thereof by spring-loaded detents 176, 177 loosely mounted in the tubular shaft 171, the detent 176 being adjustable by a thimble 178 threadably secured in the tubular shaft 171. The detents 176, 177 are substantially the same as those associated with the cutter head in United States Patent No. 2,685,309 to Schaller and a further detailed description thereof is deemed unnecessary. The detents 176, 177 may also be termed as locator plungers, since the optimum position for the cutting blades 81, 81a relative to the trackway 85 is determined by the position of the detents 176, 177. In other words, the distal ends of the springs of detents 176, 177 bear against thimble 178 and cutter head block 166, so that inward and outward adjustment of thimble 178 respectively increases and decreases the force exerted by detent 176 to correspondingly vary the neutral or optimum setting of guide shaft 171 relative to support block 153. Since guide shaft 171 is fixed to shield 166, and the cutting blades 81, 81a and shields 166, 166a are axially movable, as a unit, with quill shaft 160 relative to pulley 157 and support block 153, it is apparent that adjustment of thimble 178 also determines the neutral or optimum position of the cutting blades 81, 81a.

Since the detents 176, 177 are spring-loaded, it is apparent that the cutter head is free to move by application of forward or rearward force against the cutter head blocks 166, 166a, and upon removing such force, the detents 176, 177 return the cutter head to neutral position. Opposed ends of the slots 172 in guide shaft 171 may engage locator pin 173 and thus serve as means limiting the extent of movement of the respective cutter head. Thus, the detents 176, 177 provide means whereby the cutter heads may be moved automatically or manually inwardly or outwardly with respect to the respective cutter head supports 153 to accommodate any misalined floats in a transverse row on the fabric F and permit the fabric to be taken up at a constant rate relative to the carriages 84 and 84'.

The cutter head blocks 166, 166a may be interconnected by any suitable means to prevent rotation of the outer cutter head block 166a relative to the cutter head block 166 and the shaft 160. To this end, screws 180, 180a, which are used for securing the plows 80, 80a to the respective cutting blade shields or cutter head blocks 166, 166a are also used for securing an interconnecting bar 182 to the shields or cutter head blocks 166, 166a (Figures 5 and 7).

As heretofore stated, the cutter head blocks 166, 166a have the respective float or tuft cord guiding plows, shoes or nose-like members 80, 80a secured thereto. The body of each such plow is relatively thin and has a rounded nose or leading tip thereon so that it may readily pass between the floats or tuft cords T and the base fabric F during movements of the apparatus transversely of the main frame 20. A medial portion of each of the plows 80, 80a has raised portions or projections 185 thereon which define a groove therebetween of sufficient width to permit the peripheral portion of the corresponding rotary cutting blade to pass through the same without engaging either of the projections 185. The leading ends of the raised portions 185 are rounded so that, as the nose of the corresponding plow passes beneath a float T, the raised portions 185 raise the float and apply tension to the same as it is engaged by the corresponding rotary cutting blade to insure that the float is cleanly severed.

Now, in order to impart rotation to the rotary cutting blades 81, 81a of each of the cutter head assemblies, it will be observed in Figures 4, 5 and 7 that the pulley 157 on the quill shaft 160 is engaged by an endless pliable element or belt 190 which also engages a pulley 191 fixed on a drive shaft 192. The drive shaft 192 extends forwardly and rearwardly and is journaled in bearing blocks 193, 194 suitably secured to and depending from the corresponding swing arm 82. Suitable enlarged portions or collars 195 are provided on the shaft 192 (Figures 4 and 5) to prevent axial movement of the shaft 192. The shaft 192 also has a pinion or gear 196 fixed thereon which engages a rack 197 suitably secured to the upper surface of the horizontal flange of the corresponding breast beam or angle bar 23.

The racks 197, 197' extend longitudinally of the respective breast beams 23, 23' and in substantially parallel relationship to the respective trackways 85, 85'. Since the rack 197 is common to all of the cutter head assemblies A–D and the rack 197' is common to all of the cutter head assemblies A'–D', these racks preferably extend throughout the width of the main frame 20 or, at least, are of sufficient length so that the corresponding cutting blade driving pinions remain in engagement therewith to insure constant rotation of the corresponding rotary cutting blades during reciprocation of the carriages 84, 84'. Each arm 82 carrying a corresponding cutter head assembly, is pivotally connected, as at 200 (Figures 4 and 10) between upstanding ears or projections 201 on an adjustable base 202. The adjustable base 202 is provided with forwardly and rearwardly extending adjustment slots 203 therein (Figure 5), each of which is penetrated by an adjustment screw 204 for adjustably securing the base to the upper flange of the corresponding carriage bracket 83. It is apparent that the screws 204 may be loosened to facilitate the manual, forward and rearward adjustment of the corresponding cutter head assemblies relative to the carriage 84 and the fabric F.

This is particularly desirable when it is considered that the cutter head assemblies A, B alternate with respect to the cutter head assemblies C, D in their cutting operations. That is, one of the cutter head assemblies, such as B or C moves from approximately the center of the main frame 20 outwardly a distance approximately half way to the corresponding cloth selvage while the outermost of the cutter head assemblies A or D moves outwardly from a point approximately one-fourth of the width of the fabric from one selvage thereof to this selvage. On the other hand, the others of the cutter head assemblies move in the same relative manner with reference to the opposite side selvage of the fabric. It is apparent therefore that the plows 80, 80a associated with the cutter head assemblies A, B or C, D, as the case may be, of the particular cutter head assemblies which are moved toward the selvage in each instance should be spaced toward the direction in which the fabric is moving a slightly greater amount than the others of the cutter head assemblies so that, as the first active cutter head assemblies complete a cutting operation, the other cutter head assemblies at the same end of the machine will then be alined properly with a row of tuft cords T for severing the remaining portions thereof.

In order to insure that the plows 80, 80a are accurately positioned so as to lightly rest upon the upper surface of the fabric F adjacent the bar 25 extending transversely of the machine, it will be observed in Figures 4, 5 and 10 that the pivot 200 of the arm 82 is spaced inwardly of the inner edge of the base 202 so the arm 82 actually overlies a portion of the base 202. This overlying portion of the arm 82 is provided with means for adjustably limiting downward movement thereof relative to the carriage 84. To this end, it will be noted that a pair of adjustment or set screws 205 threadably penetrates the arm 82, the lower end of which bear against the upper surface of the base 202. Each of the screws 205 has a lock nut 206 thereon to maintain the same in the desired adjusted position.

In Figure 6, the follower 125 is shown in substantially the position it will occupy at a time when it is desired that an effective stroke of maximum length be imparted to the carriage 84, as would be desirable in cutting floats on relatively wide fabrics. When a relatively narrow fabric is being woven, the effective strokes or range of the strokes of the carriage 84 should be correspondingly changed so that the plows 80, 80a of the outer cutter head assemblies A, D do not move outwardly beyond the selvages or opposite side edges of the fabric F. Accordingly, in order to accommodate such relatively narrow fabric, the elongated bracket 126 may be adjusted from right to left in Figure 6 (in this instance, a distance approximately equal to one-fourth of the difference between the width of the two fabrics concerned) relative to the primary carriage bracket 83. In this way, the follower 125 may still traverse the entire length of the grooved portion of the worm shaft 120, since this merely causes the carriage bracket 83 to move further toward the center of the apparatus relative to the cloth selvage with each inward stroke thereof.

Since the carriage bracket 83 still moves the same distance in both instances and its range of movement only is changed by adjusting the follower carrying bracket 126, it is apparent that all the carriage brackets 83 on the bar 110 should be adjusted correspondingly.

It is thus seen that we have provided a novel float cutting apparatus having opposed or front and rear sets of a plurality of cutting devices, each set of which is provided with oppositely facing float raising plows to alternate in cutting floats and wherein means are provided for advancing the fabric F at the desired optimum speed past the float cutter head assemblies A–D, A'–D', thus facilitating fast economical cutting of floats or tuft cords on woven fabric or any other type of fabric after it has been removed from the machine on which it was originally manufactured, such as a loom.

In the drawings and specification there has been set forth a preferred embodiment of the invention and, although specific terms are employed, they are used in a generic and descriptive sense only and not for purposes of limitation, the scope of the invention being defined in the claims.

We claim:

1. Apparatus for severing tuft cords on a fabric comprising a frame, means for advancing the fabric in a substantially horizontal path from a rear to a forward portion of said frame under a predetermined tension, a plurality of spaced cutter heads disposed in two groups, one such group being adjacent the rear portion of said frame and the other group being adjacent the front portion of said frame, each cutter head including at least one cutting blade, a carriage for each group of said cutter heads, means for reciprocating each carriage transversely of said frame comprising a reversely threaded shaft journaled on said fame adjacent the path of movement of the corresponding carriage, means to drive the reversely threaded shafts, follower means carried by each carriage and engaging the threads of the respective reversely threaded shaft, and means for adjusting each of said follower means relative to the carriage on which it is carried in a direction substantially parallel to the axis of the respective reversely threaded shaft to thereby vary the range of movement imparted to the carriage.

2. An apparatus for severing floated yarn portions on a fabric comprising a frame, a plurality of spaced float cutting devices disposed in two groups, one such group being adjacent the rear portion of said frame and the other group being adjacent the front portion of said frame, a carriage for each group of float cutting devices, each float cutting device including an arm pivotally mounted on its corresponding carriage, each arm being adapted to normally overlie a portion of the fabric, a cutter head carried by each of said arms comprising a plurality of rotary cutting blades mounted on an axis substantially parallel to the floated yarn portions, means extending substantially radially from each rotary cutting blade for passing beneath the floated yarn portions on the fabric and directing the floated yarn portions to the respective cutting blade upon movement of the respective carriage, means to advance the fabric past the rotary cutting blades, and means for reciprocating each of the carriages transversely of said frame, said pivoted arms facilitating swinging their respective cutter heads away from the fabric to permit access thereto.

3. An apparatus for severing floated yarn portions on a fabric comprising, a pair of tracks disposed transversely of the frame adjacent the respective front and rear portions thereof, a carriage mounted for movement on each of the tracks, a plurality of spaced arms pivotally mounted on each of said carriages and adapted to overlie the fabric, a cutter head carried by each arm and being provided with at least one rotary cutting blade mounted on an axis substantially parallel to the path of travel of the fabric, means extending substantially radially from each rotary cutting blade for passing beneath the floated yarn portions and directing the same to each cutting blade upon movement of the corresponding carriage, means to advance the fabric past the rotary cutting blades, and means for reciprocating each of the carriages on its respective track, said pivoted arms facilitating swinging the respective cutter heads away from the fabric to permit access thereto.

4. A machine for cutting floated yarn portions on a fabric comprising a frame, means to advance the fabric through the machine in a substantially horizontal plane and under tension, at least two groups of cutter heads spaced from each other with respect to the direction of movement of the fabric and positioned above that portion of the fabric extending in said horizontal plane, each group including a plurality of cutter heads disposed in laterally spaced relationship with respect to the direction of movement of the fabric, a carriage common to each group of cutter heads, means to reciprocate each carriage laterally of the fabric, each cutter head comprising a plurality of cutting blades spaced from each other with respect to the direction of movement of the fabric, means extending from each blade substantially laterally of the fabric for passing beneath floated yarn portions and directing said portions to the corresponding blades, supporting means for the blades of each head, and said supporting means being guided for free movement on each head to and fro with respect to the direction of movement of the fabric.

5. A machine for cutting floated yarn portions on a fabric comprising a frame, means to advance the fabric through the machine in a substantially horizontal plane and under tension, at least two groups of cutter heads spaced from each other with respect to the direction of movement of the fabric and positioned above that portion of the fabric extending in said horizontal plane, each group including a plurality of cutter heads disposed in laterally spaced relationship with respect to the direction of movement of the fabric, a carriage common to each group of cutter heads, means to reciprocate each carriage laterally of the fabric, each cutter head comprising a plurality of cutting blades spaced from each other with respect to the direction of movement of the fabric, means extending from each blade substantially laterally of the fabric for passing beneath floated yarn portions and directing said portions to the corresponding blades, supporting means for the blades of each carriage, said supporting means being guided for free movement on the corresponding carriage to and fro with respect to the direction of movement of the fabric, and means limiting the extent of movement fo each of said supporting means.

6. A structure according to claim 5 including means resiliently urging said supporting means to a neutral position whereby the blades of each cutter head may move with the fabric and will return to neutral position upon the means for passing beneath floated portions moving out of engagement with corresponding floated portions.

References Cited in the file of this patent

UNITED STATES PATENTS

| | | |
|---|---|---|
| 893,474 | Fulton | July 14, 1908 |
| 1,418,104 | Spiselman | May 30, 1922 |
| 1,921,235 | Lindsey | Aug. 8, 1933 |
| 2,192,411 | Moore et al. | Mar. 5, 1940 |
| 2,598,579 | McCutchen et al. | May 27, 1952 |
| 2,664,921 | Riddle | Jan. 5, 1954 |
| 2,685,309 | Schaller | Aug. 3, 1954 |

FOREIGN PATENTS

| | | |
|---|---|---|
| 5,653 | Great Britain | of 1891 |
| 89,034 | Germany | Oct. 12, 1896 |
| 131,798 | Switzerland | May 16, 1929 |
| 602,374 | Germany | Sept. 7, 1934 |